United States Patent [19]

Pettersson

[11] Patent Number: 4,467,541
[45] Date of Patent: Aug. 28, 1984

[54] TRANSPARENCY MOUNT

[76] Inventor: Sven G. Pettersson, Gimenenstrasse 3B, CH-6300 Zug, Switzerland

[21] Appl. No.: 293,934

[22] Filed: Aug. 18, 1981

[30] Foreign Application Priority Data

Sep. 4, 1980 [SE] Sweden .............................. 8006195

[51] Int. Cl.$^3$ .............................................. G09F 1/12
[52] U.S. Cl. .................................... 40/158 B; 40/154; 40/155
[58] Field of Search ...................... 40/152, 155, 158 R, 40/158 B, 154

[56] References Cited

U.S. PATENT DOCUMENTS

| | | | |
|---|---|---|---|
| 2,227,986 | 1/1941 | Tucker | 40/154 |
| 2,352,243 | 6/1944 | Baldwin | 40/158 R |
| 2,527,765 | 10/1950 | Roehrl | 40/158 R X |
| 3,195,434 | 7/1965 | Dietz | 40/158 R |
| 3,203,127 | 8/1965 | Pettersson | 40/152 |
| 3,235,991 | 2/1966 | Harper et al. | 40/158 R |
| 3,242,605 | 3/1966 | Kleinschmidt | 40/152 |
| 3,281,976 | 11/1966 | Riedal | 40/152 |
| 3,466,780 | 9/1969 | Reid | 40/158 R |
| 3,878,632 | 4/1975 | Berggre et al. | 40/152 |

FOREIGN PATENT DOCUMENTS 486343 9/1952 Canada .............................. 40/158 B
6512227 3/1966 Netherlands ........................ 40/158

Primary Examiner—Gene Mancene
Assistant Examiner—David I. Tarnoff
Attorney, Agent, or Firm—Fred Philpitt

[57] ABSTRACT

In a transparency mount of plastic a pair of flap-like covering members are hingedly connected to opposite outer edges of a substantially square base plate having a picture opening therein. The covering members are formed integrally with the base plate and are both adapted to be folded in over one side of the same, against which marginal portions of the transparency are to be seated. In their folded-in positions the covering members, which are generally rectangular in shape, overlap opposite marginal portions of the transparency but leave considerable area portions of the base plate outside the picture opening free, and these area portions are raised to lie substantially flush with the upper faces of the folded-in covering members, thereby stiffening the mount. In their folded-in positions the covering members are retained by pegs protruding from the base plate and entering mating apertures in the covering members, the pegs serving also as positioning means for the transparency.

5 Claims, 7 Drawing Figures

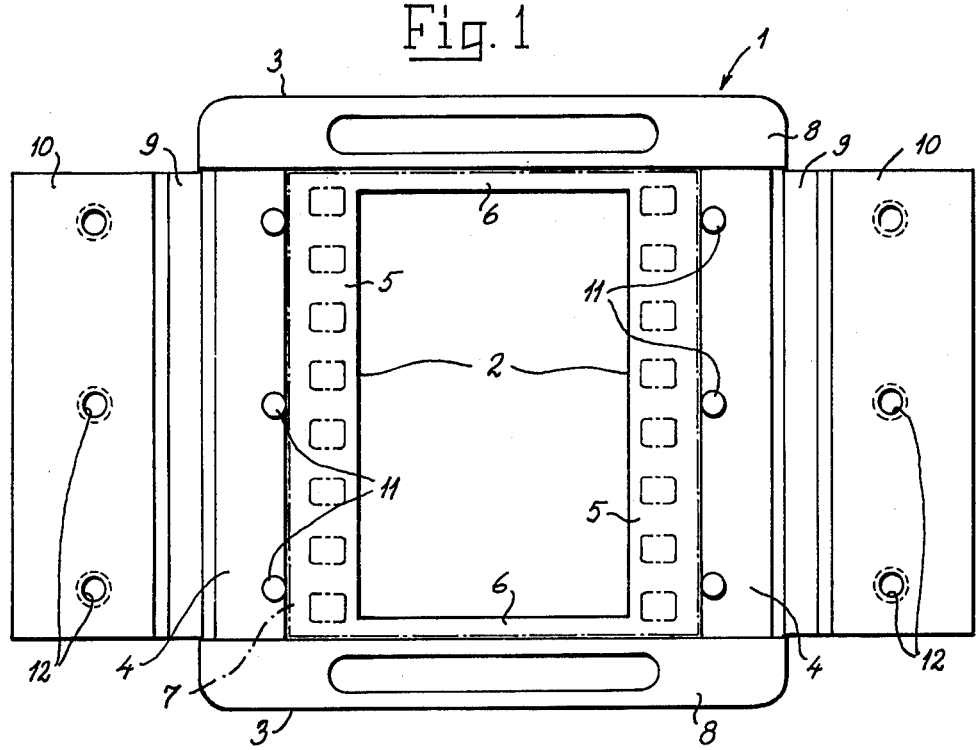
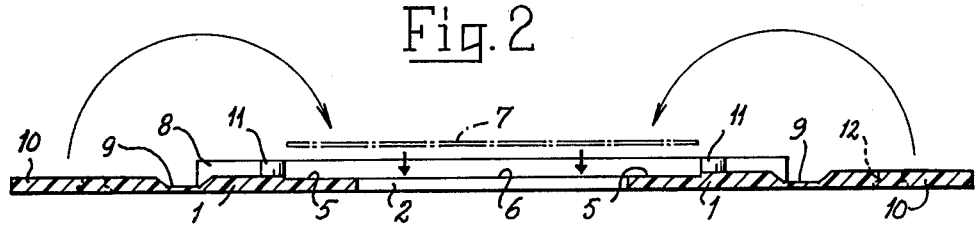
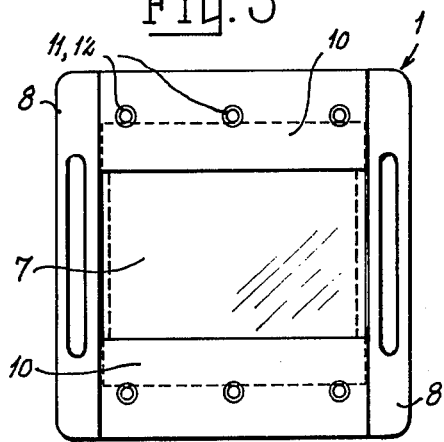
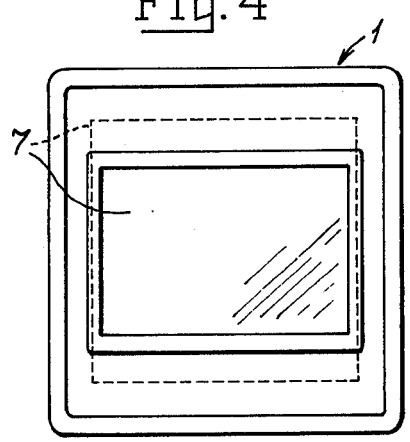

TRANSPARENCY MOUNT

BACKGROUND OF THE INVENTION

1. Field of Invention

This invention relates to a transparency mount for framing a short piece of a film strip, commonly a so called diapositive. More specifically the invention is concerned with a transparency mount of the kind comprising a generally square, frame-like base plate having a generally rectangular picture opening therein which is defined by two pairs of opposed frame members, at least one of said pairs of frame members forming on one side of the base plate and adjacent the picture opening therein seats for corresponding marginal portions of the transparency, said base plate having hingedly connected to opposite outer edges thereof flap-like covering members formed integrally with the base plate proper and being foldable inwardly from free inoperative positions, in which they extend generally outwards from their respective base plate edges, into locked operative positions, in which they are superposed over said one side of the base plate in a manner to overlap opposite marginal portions of the transparency seated thereon.

2. Description of the Prior Art

A wide variety of transparency mounts of various materials have been suggested in the prior art. Many of them are composed of two or more separate parts which are to be assembled into a coherent unit enclosing the transparency to be framed. This makes the framing operation fairly complex and is objectionable also because of comparatively high manufacturing and distribution costs. Therefore, early attempts were made to create transparency mounts in which one single piece of material was all that was needed and in which at least one portion of the piece could be folded over another portion thereof in order to complete the mount in the framing operation. In a first group of mounts of the lastmentioned kind there are only two generally similar frame-like portions of the piece to be folded together, one upon the other, while in a second group there are two or more flap-like portions to be folded in over a frame-like central portion.

Typical examples of relatively modern mounts of the first one of said lastmentioned groups are illustrated in e.g. the U.S. Pat. Nos. 3,200,527 and 3,281,976, while typical early forms of mounts of the second group are illustrated in e.g. the U.S. Pat. Nos. 2,227,986 and 2,352,243, a further, relatively modern form of mount of said second group being illustrated in the U.S. Pat. No. 3,466,780.

Transparency mounts belonging to the first one of the two groups referred to above, although having become more and more sophisticated during decades of development and improvement from a simple form of double-folded cardboard frame still used by certain film processors, are objectionable mainly for two reasons. They are fairly difficult to manufacture in plastic by injection molding, which is necessary in order to meet the demand for a reduced thickness of certain portions of the piece and an increased thickness of others, because of their almost doubled size in a folded-out position in which they have to be molded. In addition, certain difficulties are encountered in the framing operation, particularly if the transparency is not entirely flat, because complex manipulations are needed to keep it properly positioned when the one full frame portion is folded over the other.

On the other hand, the transparency mounts belonging to the second group in the various forms they have so far been presented also exhibit serious deficiencies. In the early form they have not less than four flap-like portions to be folded in over a central, frame-like one, which makes the mount unnecessarily extensive in its folded out condition and also renders the framing operation slow and inconvenient, while in the modern form the overall size of the folded out piece of material is again at least twice that of the completed mount and, in addition, of such an irregular and complex shape that it is easily damaged when handled. Also, the early form must be made of a pliant but substantially non-resilient material, such as sheet aluminum, in order to remain closed after folding and, hence, cannot be made from plastic as desirable, while the modern form relies on the use of adhesive for keeping the mount closed after completion and for making the mount sufficiently rigid in its completed condition, which makes it difficult to remove the framed transparency without damage and puts a reuse of the mount out of the question.

SUMMARY OF THE INVENTION

The aim of this invention is to provide an improved transparency mount of the kind referred to in the introductory paragraph of this specification or, in other words, a mount belonging to the second group referred to just above, which is particularly well suited for mass-production from a thermoplastic by an injection-molding process thanks to a minimum overall size and a robust form that is not likely to be changed or damaged when the molded body is ejected from its mold cavity or otherwise handled, which makes the framing operation extremely simple, rapid and convenient, not the least for amateurs, and which after completion, i.e. after having been closed about a transparency to be framed, is surprisingly rigid and has no noticeable tendency to inadvertently reopen.

According to the invention this is basically achieved by the fact that each of said flap-like covering members is generally rectangular in shape and has a free length substantially corresponding to the distance between the edge of the base plate to which the covering member is hingedly connected and the adjacent border of the picture opening in said base plate, that interengaging male and female retainer means are provided for locking the covering members in their operative positions, and that the frame members of the base plate extending at right angles to those base plate edges to which the covering members are connected have raised surface portions thereon extending along opposite sides of said picture opening and having a height generally corresponding to the thickness of said covering members.

Additional features of the invention will become apparent from the following and will also be specifically pointed out in the accompanying claims.

BRIEF DESCRIPTION OF THE DRAWINGS

For further elucidation of the invention two preferred embodiments thereof will now be described more in detail, reference being had to the accompanying drawings in which FIG. 1 is a plan view of a first form of transparency mount embodying the invention in a still unused, flat and folded-out position, FIG. 2 is a central longitudinal section of the mount shown in FIG. 1, FIG. 3 is a front view on a reduced scale of a mount of the kind illustrated in FIGS. 1 and 2 in a completed condition having a transparency framed therein, FIG. 4 is a rear view likewise on a reduced scale of the completed mount of FIG. 3.

DESCRIPTION OF THE PREFERRED EMBODIMENTS

Figure 5:
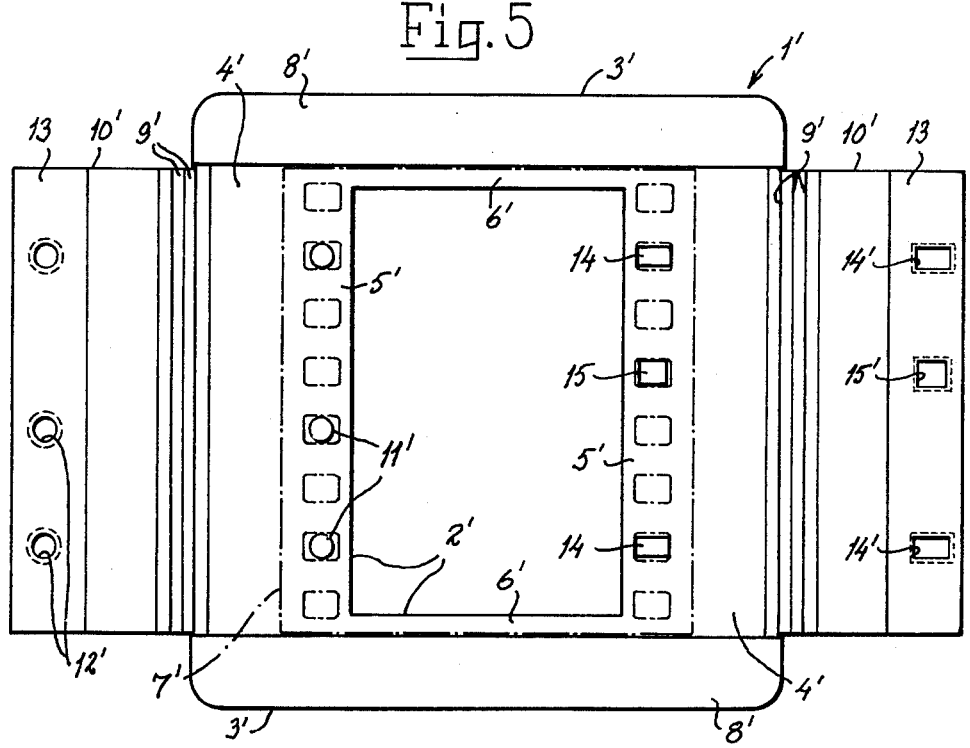
FIG. 5 is a plan view similar to that of FIG. 1 but showing a slightly modified form of transparency mount embodying the invention.

The two transparency mounts illustrated in the drawings are made of a thermoplastic having in sections of considerably reduced thickness a high flexibility and a certain elasticity but otherwise being fairly rigid and also sufficiently heat resistant to stand the heat in a projector without weakening, a well known injection molding process being used in their production. Although both the two illustrated variants of the mount are adapted to be used with the most usual type of transparency, namely a short piece of a diapositive film strip having perforations along both its longitudinal margins, it should be readily understood that mounts embodying the invention may also be made for use with other kinds of transparencies, the necessary modifications being obvious to the producer.

The transparency mount illustrated in FIGS. 1 to 4 comprises a generally square base plate 1 having a central, rectangular picture opening 2 therein which is defined by pairs of opposed frame members 3 and 4, respectively. The innermost marginal portions of all the four frame members 3 and 4 form adjacent the picture opening 2 on one side of the base plate 1 seating surfaces 5 and 6 for corresponding outer marginal portions of the transparency 7, it being understood that the size of the picture opening 2 corresponds to or is just slightly smaller than the image on the transparency 7. In this particular case the seating surfaces 5 and 6 are recessed in relation to the upper faces of the portions of the two frame members 4 outside the seating surfaces 5, the difference in height very slightly exceeding the thickness of the transparency 7. Outside the seating surfaces 6 the frame members 3 have raised surface portions 8 extending out to the outer edges of the frame members 4 and giving the frame members 3 a total thickness corresponding to the desired thickness of the completed, closed mount and being approximately twice the thickness of the frame members 4 outside the seating surfaces 5.

Through hinge-forming, thinned portions 9 a pair of flap-like covering members 10 are connected to opposite edges of the base plate 1 and, more specifically, to the outer edges of the two relatively thin frame members 4. These two covering members 10, which are generally rectangular in shape and like the hinge portions 9 molded integrally with the base plate 1, are adapted to be folded-in over their respective frame members 4 from their outwardly extending positions, shown in FIGS. 1 and 2, in which they are molded. The covering members 10 extend between the two raised surface portions 8 and have a free length substantially but not fully corresponding to the full width of the frame members 4 so as to extend in their folded-in positions almost up to the corresponding borders of the picture opening 2, thus covering also the seating surfaces 5, thereby keeping the transparency 7 resting thereon in place without locking it. The thickness of the covering members 10 is approximately the same as that of the frame members 4 and half that of the completed, closed mount, whereby the upper faces of the folded-in covering members will be substantially flush with the upper faces of the raised surface portions 8.

In their folded-in, operative positions the flap-like covering members 10 are locked by interengaging male and female retainer means comprising pegs 11 made integral with and projecting from the base plate 1 and mating apertures 12 provided in the covering members. Three such pegs 11 on each frame member 4 and three mating apertures 12 in each covering member 10 will usually give a satisfactory locking, but more may be used if desirable. The pegs 11 on each frame member 4 are arranged in a row along the border of the related seating surface 5 whereby they will also serve as positioning means for the transparency 7 when the latter is seated on the base plate 1 preparatory to the folding in of the covering members, the raised surface portions 8 on the frame members 3 serving as positioning means for the transparency 7 in the other direction. The pegs 11 have a height approximately corresponding to that of the raised surface portions 8 and are generally cylindrical. The mating apertures 12 are also cylindrical and have a diameter to closely surround the pegs 11 in a manner to retain them by a frictional grip.

Figure 7:
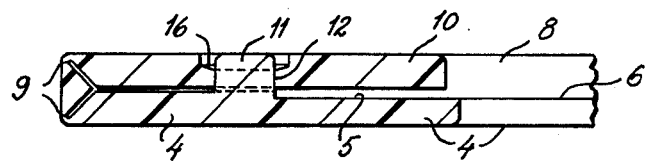
FIG. 7 is a fragmentary section on a heavily enlarged scale illustrating a preferred arrangement of the interengaging male and female means for retaining the covering members in their closed positions.

With particular reference to FIG. 7 it can be seen that the apertures 12 are preferably formed in and passing through small thinned area portions of the covering members 10 obtained by providing recesses 16 in the rear or upper faces thereof. It has been found that by letting the top portions of the pegs 11 protrude into such recesses or, in other words, by letting the walls of the apertures 12 engage only portions of the pegs which are clearly below the peg tops, the locking effect of the male and female retainer means will be much improved in comparison with the locking effect obtained when the pegs simply enter and fill out their mating apertures without protruding over the outlet ends thereof. In addition, this arrangement facilitates the establishment of a proper, full connection, when the covering members 10 are pressed down over their respective frame members 4 after the transparency 7 to be framed has been seated on the base plate.

As will be readily understood, the framing operation is extremely simple and convenient with the mount just described. All that is needed is to position the transparency 7 on the base plate 1 and thereafter to fold-in and to firmly press down the two flap-like covering members 10, either both at the same time or one by one as found most convenient and suitable in view of possible cupping tendencies of the transparency.

Figure 6:
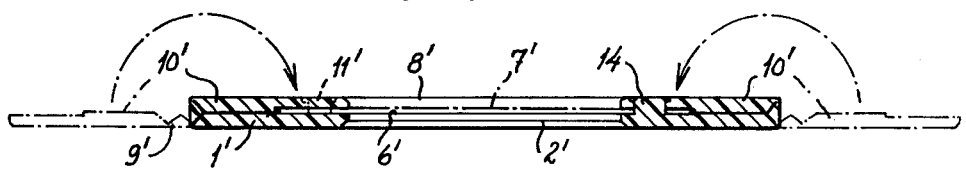
FIG. 6 is a central longitudinal section of the mount in FIG. 5 in a completed condition, the initial positions of the covering members being indicated by dash-and-dot lines.

The variant of the transparency mount illustrated in FIGS. 5 and 6 differs from the one just described only in details and, therefore, the same reference numerals followed by a prime mark have been used for designating identical or similar parts. Besides that the hinge portions 9' have been slightly modified in a manner well known per se to assure a more distinct folding of the flap-like covering members 10′, and that the seating surfaces 5′ and 6′ on the base plate 1′ are not recessed in relation to the upper faces of the outer portions of the frame members 4′, the necessary room for the transparency 7′ being instead provided by recessed outer marginal portions 13 of the covering members 10′, the differences are mainly to be found in the location and the configuration of the interengaging male and female retainer means.

Thus the pegs 11′ to the left of the picture opening 2′ in FIG. 5 have been moved inwards in order to pass through some of the perforations of the transparency 7′ before entering their mating apertures 12′ in the left hand covering member 10′ when the latter is folded in and pressed down as illustrated in FIG. 6. The same modification has been made to the right of the picture opening 2′, but here the pegs 14 and 15 have also been given a generally rectangular shape in order to make possible, in a manner well known per se, a very accurate positioning of the image of the transparency in relation to the outer contour of the completed mount which is sometimes desirable, the two pegs 14 defining the position of the transparency in its lateral direction and the single peg 15 between them defining the position of the transparency in its vertical direction, all as seen in FIG. 5. Of course, the mating apertures 14′ and 15′ for the pegs 14 and 15 then also have to be generally rectangular as shown.

It is to be noted that the positioning pegs 14 and 15, owing to their configuration and arrangement as shown in FIG. 5, while permitting a certain expansion and contraction of the transparency 7′ in its longitudinal (vertical) direction on either side of the middlemost peg 15, give the engaged (right hand) margin of the transparency a fixed position which means that the opposite margin thereof must have a certain freedom in order to prevent the transparency from buckling. Such freedom is assured by choosing the diameter of the pegs 11′ somewhat smaller than the widths of the perforations of the transparency 7′.

As an alternative, the rectangular pegs 14 and 15 on one side of the picture opening 2′ may be used in combination with an arrangement of the kind illustrated in FIG. 1 on the other side thereof. Also, if there is no need for a precise positioning of the transparency in the mount, the peg arrangement illustrated to the left in FIG. 5 may be used on both sides of the picture opening.

Evidently the use of interengaging male and female retainer means of the kinds hereinbefore described makes it possible to open the mount and to take out the transparency whenever desirable, the mount then being ready for immediate reuse and the transparency being completely unharmed.

As can be readily understood, the size and thickness of the mount may be varied within wide limits. Also the relationship in size between the mount itself and the transparency to be framed therein may differ from that illustrated in the drawings. In order to save material and to decorate the mount recessed areas may be provided in the raised surface portions 8 as well as in the bottom or rear side of the base plate 1 as indicated in FIGS. 3 and 4.

I claim:

1. A transparency mount molded in plastic as a single piece and comprising
   (A) a substantially square, frame-like base plate having a generally rectangular picture opening therein and being composed of two pairs of opposed frame members defining said opening,
   (B) one of said pairs of frame members forming on one face of said base plate and adjacent said picture opening therein seats for corresponding opposite marginal portions of the transparency to be framed,
   (C) a single pair of flap-like covering members formed integrally with said base plate and being hingedly connected to opposite outer edges of said one pair of frame members by means of thinned flexible portions of the molded piece in a manner to be foldable inwardly from free inoperative positions, in which they extend generally outwards from their respective base plate edges, into operative positions, in which they superpose respective parts of said one face of said base plate in a manner to overlap opposite marginal portions only of the transparency to be framed,
   (D) each of said flap-like covering members being generally rectangular in shape and having a free outer edge extending in parallel relationship to the base plate edge, to which the flap-like covering member is hingedly connected, and at a distance from that edge which at most corresponds to the distance between said related base plate edge and the adjacent border of said picture opening in said base plate, and
   (E) interengageable male and female retainer means formed integrally with the molded piece for releasably locking said flap-like covering members in their operative positions relative to said base plate,
   (F) the other pair of frame members of said base plate extending at right angles to those base plate edges to which said flap-like covering members are hingedly connected having on said one face of said base plate raised surface portions extending along opposite sides of said picture opening and having a height generally corresponding to the thickness of said flap-like covering members, said raised surface portions forming at least substantial parts of the two remaining base plate edges and substantially filling out the area of said one face of said base plate which is left uncovered by said flap-like covering members when they occupy their operative positions.

2. A transparency mount as claimed in claim 1, wherein each of said flap-like covering members extends along only a central part of the full length of the base plate edge to which it is hingedly connected, and wherein said raised surface portions on said one face of said base plate extend to said base plate edge on both sides of each covering member when the latter occupies its operative position.

3. A transparency mount as claimed in claim 1, wherein said other pair of frame members of said base plate extending at right angles to those base plate edges to which said flap-like covering members are hingedly connected form between said raised surface portions thereon and their respective adjacent borders of said picture opening additional seats for the transparency to be framed, said additional seats being left uncovered by said flap-like covering members when the latter occupy their operative positions.

4. A transparency mount as claimed in claim 1, wherein said interengageable male and female retainer means for releasably locking said flap-like covering members in their operative positions comprise pegs provided on said one face of said base plate and mating apertures provided in said flap-like covering members, said pegs being arranged in a manner to serve at the same time as positioning means for the transparency to be framed.

5. A transparency mount as claimed in claim 4, wherein said apertures are provided in and pass through thinned portions of said flap-like covering members, and wherein said pegs are of sufficient height to pass through their related apertures and to protrude over the outlet ends thereof when full connection is established.

* * * * *